(12) United States Patent
Wu et al.

(10) Patent No.: US 8,066,812 B2
(45) Date of Patent: Nov. 29, 2011

(54) DURABLE MAGNESIUM OXYCHLORIDE CEMENT AND PROCESS THEREFOR

(75) Inventors: Xiao Wu, Sint-Stevens-Woluwe (BE); Octavian Anton, Brussels (BE); Ann Opsommer, Koninslo (BE)

(73) Assignee: Promat Research and Technology Centre, N.V., Tisselt (BE)

( * ) Notice: Subject to any disclaimer, the term of this patent is extended or adjusted under 35 U.S.C. 154(b) by 0 days.

(21) Appl. No.: 12/993,795

(22) PCT Filed: May 19, 2009

(86) PCT No.: PCT/EP2009/056038
§ 371 (c)(1),
(2), (4) Date: Nov. 19, 2010

(87) PCT Pub. No.: WO2009/141325
PCT Pub. Date: Nov. 26, 2009

(65) Prior Publication Data
US 2011/0088597 A1  Apr. 21, 2011

(30) Foreign Application Priority Data
May 20, 2008 (EP) .................................. 08156572

(51) Int. Cl.
*C04B 28/32* (2006.01)
(52) U.S. Cl. .................... 106/685; 106/686; 106/688
(58) Field of Classification Search .............. 106/685, 106/686, 688
See application file for complete search history.

(56) References Cited

U.S. PATENT DOCUMENTS

| | | | |
|---|---|---|---|
| 1,586,045 A | 5/1926 | Romerill | |
| 1,634,505 A * | 7/1927 | McCaughey | 106/685 |
| 2,228,061 A | 1/1941 | Maas | |
| 2,463,663 A | 3/1949 | Wand | |
| 3,458,327 A | 7/1969 | Frazer | |
| 3,482,493 A * | 12/1969 | Schlosser | 404/72 |
| 3,495,997 A * | 2/1970 | Sherry | 106/685 |
| 3,778,304 A * | 12/1973 | Thompson | 427/243 |
| 3,951,885 A * | 4/1976 | Thompson | 521/137 |
| 3,963,849 A * | 6/1976 | Thompson | 428/182 |
| 3,969,453 A * | 7/1976 | Thompson | 264/42 |
| 4,352,694 A | 10/1982 | Smith-Johannsen | |
| 4,613,627 A | 9/1986 | Sherman et al. | |
| 4,838,941 A * | 6/1989 | Hill | 106/685 |
| 5,004,505 A * | 4/1991 | Alley et al. | 106/685 |
| 5,039,454 A * | 8/1991 | Policastro et al. | 252/610 |
| 5,110,361 A * | 5/1992 | Alley et al. | 106/685 |
| 5,213,161 A * | 5/1993 | King et al. | 166/293 |
| 5,220,960 A * | 6/1993 | Totten et al. | 166/293 |
| 5,273,547 A * | 12/1993 | Reidies | 8/107 |
| 6,200,381 B1 * | 3/2001 | Rechichi | 106/801 |
| 6,395,084 B1 * | 5/2002 | Priest | 106/801 |
| 7,658,795 B2 * | 2/2010 | Caine et al. | 106/685 |
| 7,794,688 B2 * | 9/2010 | Caine et al. | 423/635 |

FOREIGN PATENT DOCUMENTS

| | | |
|---|---|---|
| CN | 1998-1025057 | 11/1998 |
| EP | 0 212 743 A2 | 3/1987 |
| GB | 647 810 A | 12/1950 |
| GB | 2 348 875 A | 10/2000 |
| SU | 1258986 A * | 9/1986 |

OTHER PUBLICATIONS

International Search Report & Written Opinion of PCT/EP2009/056038 filed Aug. 19, 2009.
Extended European Search Report of EP Application No. 08 15 6572.3 dated Feb. 27, 2009.
Kopeikin, V.A. et al: "Plates from semidry compositions based on vermiculite and phosphate binders for thermal insulation and fire protection of building structures" Chemical Abstracts, American Chemical Society, US, vol. 103, No. 8, Jan. 1, 1900, p. 271.
Wu, S. et al: "Fireproof decorative boards" Chemical Abstract, American Chemical Society, US, vol. 119, No. 12, Dec. 13, 1993, p. 388.
International Search Report for PCT/EP2009/056038 dated Aug. 10, 2009.

* cited by examiner

*Primary Examiner* — Anthony Green
(74) *Attorney, Agent, or Firm* — Venable LLP; Michael A. Gollin; Michael E. Nelson

(57) ABSTRACT

A magnesium oxychloride cement (MOC) composition comprising:
  caustic calcined magnesia
  magnesium chloride
  phosphoric acids or corresponding salts
  exfoliated vermiculite.

22 Claims, No Drawings

DURABLE MAGNESIUM OXYCHLORIDE CEMENT AND PROCESS THEREFOR

This application is a U.S. national stage application of PCT/EP2009/056038, filed May 19, 2009, and claims priority to European patent application no. 08156572.3, filed May 20, 2008 each of which is incorporated by reference in its entirety.

The present invention relates to a composition and process for producing a magnesium oxychloride cement (MOC) and product thereof. This MOC can be formed in boards or sprayed and is especially useful for fire protection and building construction.

Magnesium oxychloride cement (also known as Sorel cement) is formed by a reaction of caustic calcined magnesia (MgO) and an aqueous magnesium chloride solution. It has been investigated since a number of years. When cured, this cement is generally characterized by the presence of crystalline phases of $5Mg(OH)_2.MgCl_2.8H_2O$ (phase 5, or F5 hereafter) and $3Mg(OH)_2.MgCl_2.8H_2O$ (phase 3, or F3 hereafter).

The relative proportion of the two compounds depends, besides other factors, on the stoechiometry of the reaction. Compared to Ordinary Portland Cement (OPC) based products, the MOC products have many advantages in terms of bending strength, surface hardness, frost resistance, fungi resistance and low thermal shrinkage at high temperatures. For optimal performances of the product, the formation of the F5-phase is preferred (Eq.1).

$$5MgO+MgCl_2+13H_2O \rightarrow 5Mg(OH)_2.MgCl_2.8H_2O \quad (1)$$

However, the traditional MOC made in the ternary phase system MgO—MgCl₂—H₂O has two fundamental weaknesses:

The F5 is unstable in prolonged contact with water. Under these conditions, F5 converts into brucite $(Mg(OH)_2)$ and F3 phase and cracking occurs because of the large volume expansion associated with the phase transformation from MgO into brucite $(Mg(OH)_2)$ During ageing, carbonation of MOC occurs and F5 and F3 transform into chlorartinite $(Mg(OH)_2.MgCl_2.2MgCO_3.6H_2O)$ and hydromagnesite $(5MgO.4CO_2.5H_2O)$. These transformations lead to the development of cracks that reduce the mechanical strength (P. Maravelaki, et. al, Sorel's cement mortar Decay susceptibility and effect on Pentelic marble, Cement and concrete research, 29(1999), 1929-1935; M. D. de Castellar, et. al, Cracks in Sorel's cement polishing bricks as a result of magnesium oxychloride carbonation, Cement and concrete research, 26(8), 1199-1202, 1996)

Many efforts have been made to improve water resistance of the MOC products using additives such as ethyl silicate, organic carboxylic acids and water repellents, either by incorporation in the cement mix prior to the setting or by application to the hardened cement. The most effective method is to stabilize the F5 $(5Mg(OH)_2.MgCl_2.8H_2O)$ by addition of phosphoric acid or its soluble salts as disclosed by U.S. Pat. No. 4,352,694 and obtain a water resistant MOC material for construction materials. With these additions, the ratio of wet/dry compressive strength of the MOC products can be above 80%, which is at the same level as that of OPC based products.

However, carbonation phenomena of MOC still occur, rising concerns about the durability of the product in the long term. Formation of chlorartinite starts with the conversion of F5 to the F3 that reacts with $CO_2$ (Eq.2). Hydromagnesite forms during the carbonation of MOC matrixes when $MgCl_2$-leaching occurs.

$$5Mg(OH)_2.MgCl_2.8H_2O \rightarrow 3Mg(OH)_2.MgCl_2.8H_2O+2\,Mg(OH)_2$$

$$3Mg(OH)_2.MgCl_2.8H_2O+2CO2 \rightarrow Mg(OH)_2.MgCl_2.2MgCO_3.6H_2O+2H_2O \quad (2)$$

In both cases, the development of carbonation affects the stability of the binding phase F5 and therefore, the strength and dimensional stability of the MOC material are undermined.

On the other hand, due to the hygroscopic nature of the $MgCl_2$, which can form during ageing reactions, this phase will migrate in a humid environment to the surface of the product and will either precipitate as whitish $MgCl_2$ hydrate salts appearing as efflorescence, or absorb water showing a wet surface or sweating phenomena. In the worst case, there can be water drops hanging on the surface of the material.

It was the object of the present invention to provide a magnesium oxychloride cement (MOC) composition having improved properties, especially with respect to resistance to carbonation.

The problem has been solved by a magnesium oxychloride cement (MOC) composition comprising:
  caustic calcined magnesia
  magnesium chloride
  phosphoric acids or corresponding salts
  exfoliated vermiculite.

The exfoliated vermiculite has the surprising effect of stabilizing the F5 against carbonation. Accordingly, a stable and durable MOC product can be obtained, characterized in that it develops nearly no chlorartinite and hydromagnesite during ageing.

The name vermiculite applies to a group of layered structure Magnesium Silicate hydrate minerals characterized by their ability to expand into long, worm-like strands when heated. The process of mineral expansion in these conditions is named exfoliation. As a natural mineral, the vermiculite may comprise impurities such as mixed layer clay and mica.

Exfoliated vermiculite is a known heat-resistant resilient material. Exfoliated vermiculite is conventionally formed by expanding mineral vermiculite (crude vermiculite) using hot gas, this material being referred to herein as "gas-exfoliated vermiculite". The gas may be thermally generated, in which case the product is called "thermally-exfoliated vermiculite" (TEV). TEV may be made by flash-heating mineral vermiculite to 750-1000° C., at which temperature the water (free and combined) in the ore mineral structure vaporizes rapidly and ionic repulsion forces apart the silicate sheets which form the raw material, so bringing about an expansion of 10-20 times perpendicular to the plane of the sheets. The granules formed have a chemical composition which (apart from the loss of water) is identical to that of the raw material. Gas-exfoliated vermiculite may also be made by treating raw vermiculite with a liquid chemical, e.g. hydrogen peroxide, which penetrates between the silicate sheets and subsequently evolves a gas, e.g. oxygen, to bring about exfoliation.

Another way for exfoliation is by temperature developed in a microwave furnace.

A different form of exfoliated vermiculite is known as "chemically-exfoliated vermiculite" (CEV) and is formed by treating the ore and swelling it in water. In one possible preparation method, the ore is treated with saturated sodium chloride solution to exchange magnesium ions for sodium ions, and then with n-butyl ammonium chloride to replace sodium ions with $n-C_4H_9NH_3^+$ ions. On washing with water swelling takes place. The swollen material is then subjected to high shear to produce an aqueous suspension of very fine (diameter below 50 μm) vermiculite particles.

Both TEV and CEV may be used according to the invention.

Typically, exfoliated Vermiculite has a bulk density below 0.300 g/cm$^3$, preferably between 0.050-0.200 g/cm$^3$, more preferably between 0.100-0.150 g/cm$^3$. Crude vermiculite has a bulk density between 0.500-1.000 g/cm$^3$.

A suitable size of the exfoliated vermiculite is between 0-10 mm, preferably between 0-2 mm. It is usually light weight, incombustible, resistant to high temperatures and has a low thermal conductivity.

In a preferred embodiment, the MOC comprises exfoliated vermiculite in an amount from 1 to 80% by total weight, preferably 1 to 30%, more preferably 5 to 20% by total weight.

It is surprisingly found that exfoliated vermiculite does participate in one way or another into the MOC reaction in the system MgO—MgCl$_2$—H$_2$O. Analysis by scanning electronic microscopy (SEM) on the MOC material of present invention demonstrates that, as a reaction product between the vermiculite and MOC, fiber-crystals are formed that grow on the lamella of exfoliated vermiculite. EDAX spectra indicate the crystals contain Mg, Si, Al and Cl. Although the exact mechanism is still unknown, this interaction appears to further stabilize the F5 in wet condition and reduces the carbonation during ageing.

It is found that the use of the exfoliated vermiculite is also advantageous over other light weight materials for MOC, such as expanded perlite, in terms of mixture homogeneity. It is observed that the exfoliated vermiculite can be easily mixed and dispersed homogeneously over whole volume of the MgO—MgCl$_2$—H$_2$O slurry during mixing. On the other hand, expanded perlite tends to float on top of the MOC slurry during mixing and leads to a less homogeneous product having more expanded perlite on the top and nearly only MOC paste on the bottom. Many efforts have to be made to correct this segregation phenomena, e.g., by using expanded perlite-types with different particle size distributions. However, this is practically difficult to control due to batch wise differences in the quality of the expanded perlite. Consequently, the MOC product made with expanded perlite as lightening agent has large variation in physical properties. In the worst case, it induces different setting shrinkage and drying shrinkage during the curing process and hence leads to deformation or cracking.

The MOC of the invention comprises phosphoric acid or corresponding salts. In some embodiments, it may comprise at least one further stabilizer to improve water resistance, especially a stabilizer selected from the group of organic acids, alkyl silicates, hydrophobic silicon and siloxane compounds, and mixtures thereof.

The MOC of the invention is for example obtainable by mixing reactive MgO 7-50% by weight, preferably 20% by weight or more MgCl$_2$ 3-20% by weight, preferably 8% by weight or more H$_2$O 9-50% by weight, preferably 28% by weight or more phosphoric acid or corresponding salts 0.05-5% by weight, calculated as P$_2$O$_5$.

exfoliated vermiculite 1-80% by weight, and functional additives or fillers 0-20% by weight.

A suitable amount of phosphoric acid or a corresponding salt is 0.05 to 5% by weight, preferably of 0.05-1% by weight, calculated as P$_2$O$_5$. Preferred salts are selected from the group consisting of ortho-phosphoric acid, tri-sodium phosphate and its hydrates, sodium polyphosphate and its hydrates, aluminum phosphate and its hydrates, and mixtures thereof.

Suitable functional additives or fillers are selected from the group of CaCO$_3$, fly ash from thermal power plant, bottom ash from thermal power plant, saw dust, silica fume, mica and expanded perlite, foaming agents and/or air entrainers, cellulose fiber, chopped glass fiber, glass fiber mat and mixtures thereof.

Further functional additives are setting accelerators such as hydrochloric acid, setting retarders such as sulphuric acid, foaming agents, air entrainers, water repellents, super plasticizers, and mixtures thereof.

Organic polymers such as PVC, PVA and/or EVA can be used in the material of present invention to improve even further the hydric movement and limit efflorescence and sweating.

E-glass fibers can be employed in the material of present invention for reinforcement due to low alkalinity of the MOC material. For example, a sandwich structure with top two skins reinforced by glass fiber mat and a core with light weight mixture based on the MOC material of present invention is especially advantageous for applications in building constructions and for fire protection systems.

Expanded perlite can be added additionally to the composition of the present invention to improve sound insulation.

Traditional foaming agent and air entrainer can be applied to the material of present invention to make very light weight structures having densities in the rage of 300-800 kg/m$^3$. A suitable foaming agent is for example H$_2$O$_2$.

Other traditional fillers for building construction can be used in the MOC material of present invention. They can in general improve mechanical strength meanwhile reducing the total cost of the MOC material of present invention.

The MOC product of this invention has a better homogeneity than the products based upon expanded perlite. Thanks to a good affinity between exfoliated vermiculite and MgCl$_2$ aq. solution, the distribution of the vermiculite in the MOC slurry is homogeneous over the whole volume of the mixture during processing.

The MOC product of the present invention has high bending strength, surface hardness, good water resistance, low thermal shrinkage and high temperature resistance.

The material has a more homogeneous structure with better carbonation resistance than the traditional MOC-materials. This is possible due to binding of any residual MgCl$_2$ by interaction with phases in exfoliated vermiculite.

It is especially suitable for building and fire protection applications such as ceilings, partitions, air duct, and the like. The release of HCl in fire applications is a disadvantage because of the corrosive properties. Therefore, it is also an objective of the present invention to provide a MOC material with reduced HCl release during heating.

The CCM (MgO) of present invention can be obtained by calcination of magnesite ore (MgCO$_3$), magnesium hydroxide (Mg(OH)$_2$) or sea water (braine). Calcined magnesite is the preferred source and suitable calcination temperatures of the CCM are in the range 600-1000° C. and preferably between 700-900° C. The suitable grain size is in the range 100-200 mesh.

The MgCl$_2$ aqueous solution can be prepared by dissolving the MgCl$_2$ or its hydrates in water. MgCl$_2$.6H$_2$O is the preferred form. It is commercially available all over the world and is easy to use. Suitable concentration of the MgCl$_2$ aqueous solution is between 18-30 Baumé, preferably between 20-25 Baumé, calculated by following formula:

$$d = m - m/s \qquad (3)$$

where d is degree Baumé, m=145, s is specific gravity of the solution.

A second embodiment of the invention is a magnesium oxychloride cement (MOC) composition comprising calcite ($CaCO_3$) in an amount from 0.1 to 20% by weight.

Surprisingly, the presence of calcite reduces the HCl release of the material in case of fire. HCl is corrosive and may damage for example electrical installations. It may also be dangerous to people near the fire.

Preferably, the calcite has a particle size from 0-200 μm, preferably from 5-100 μm.

A third embodiment of the invention is a product obtainable by casting or spraying the MOC of the invention.

A fourth embodiment of the invention is a process of making a magnesium oxychloride cement (MOC) comprising the step of mixing reactive MgO 7-50% by weight, $MgCl_2$ 3-20% by weight, $H_2O$ 9-50% by weight, F5 stabilizer 0.05-5% by weight, exfoliated vermiculite 1-80% by weight and/or calcite 0.1 to 20% by weight, and functional additives or fillers 0-20%.

A fifth embodiment of the invention is the use of exfoliated vermiculite together with phosphoric acid or a corresponding salt as an additive in a MOC to improve ageing stability.

Yet a further embodiment of the invention is the use of calcite ($CaCO_3$) as an additive in a MOC matrix to reduce HCl release in case of fire.

The invention is exemplified by the following, non-limiting examples.

EXAMPLE 1

A MOC composition is prepared by mixing a calcined caustic magnesia with particle size of 100 mesh, an aqueous solution of $MgCl_2$, phosphoric acid and exfoliated vermiculite, having a mix formulation expressed as MgO 32.2%, $MgCl_2$ 12.6%, $P_2O_5$ 0.3%, $H_2O$ 41.0%, and exfoliated vermiculite 13.9%.

On the other hand, a conventional MOC composition is made by the same as above, but the amount of the exfoliated vermiculite is replaced by expanded perlite having a comparable particle size distribution as that of exfoliated vermiculite.

After mixing by a planetary mixer for 10 min., the resulting mixture is casted in a mould. Curing is performed at 20° C. in covered condition for 1 day, after which the sample is demoulded and left in open conditions at 20° C. for 7 days.

Accelerated ageing tests of the samples were performed in a climate chamber by exposing the material at 40° C. with 95% relative humidity for 7 days in a 100% $CO_2$ environment.

The results before and after the ageing test are shown in Tab. 1.

TABLE 1

| | Test results | | | |
|---|---|---|---|---|
| | Density | Bending strength | | Carbonation after the test |
| | Before test g/cm³ | Before test MPa | After test MPa | Chlorartinite by XRD | Hydromagnesite by XRD |
| Present invention with exfoliated vermiculite | 1.221 | 11.8 | 12.5 | no | no |
| Convention MOC with expanded perlite | 1.256 | 9.4 | 9.0 | significant | significant |

EXAMPLE 2

A MOC composition of present invention is prepared by mixing a calcined caustic magnesia with particle size of 100 mesh, a $MgCl_2$ aqueous solution, phosphoric acid and exfoliated vermiculite, having a mix formulation expressed as MgO 28.8%, $MgCl_2$ 13.3%, $P_2O_5$ 0.4%, $H_2O$ 43.4%, and exfoliated vermiculite 14.1%.

The curing condition was the same as for Example 1.

Samples with 400 mm×400 mm×15 mm are made. After curing, they are cut into 10 smaller samples of 400 mm×40 mm×15 mm to test homogeneity of the mixture in terms of bending strength, density and their standard deviation. The results are given in table 2.

TABLE 2

| | Test results | | | |
|---|---|---|---|---|
| | Bulk density | | Bending strength Average MPa | Thermal shrinkage Average, at 950° C. for 3 hrs % |
| | Average g/cm³ | STDEV/ Average* % | | |
| Present invention with exfoliated vermiculite | 1.172 | 1.2 | 10.4 | 0.1 |
| Conventional MOC with expanded perlite | 1.036 | 5.1 | 7.2 | broken |

*SDTEV = standard deviation

The sample of present invention has high strength and homogeneous mixture measured by very small data spreading in bulk density of 1.2%. At 950° C. the thermal shrinkage is very low.

In contrast, the sample of conventional MOC has lower bending strength, larger variation in bulk density of 5.1% (besides the segregation in thickness). It eventually expands at 950° C. and after the temperature treatment; the structure appears loose and broken.

EXAMPLE 3

A MOC board of present invention with improved performance is prepared by mixing a calcined caustic magnesia with particle size of 100 mesh, a $MgCl_2$ aqueous solution, a phosphoric acid and exfoliated vermiculite, having a mix formulation expressed as MgO 25.9%, $MgCl_2$ 12.0%, $P_2O_5$ 0.3%, $H_2O$ 39.1%, exfoliated vermiculite 12.7%, and $CaCO_3$ (Calcite) 10.0%.

On the other hand, a conventional MOC composition is made by the same as above, but the amount of the exfoliated vermiculite is replaced by expanded perlite having a comparable particle size distribution as that of exfoliated vermiculite.

Curing and drying of the samples are shown by the Example 2.

A fire test is carried out. Hot side of the board is exposed to a fire with temperature increase according to the standard ISO 834; whereas cold side is exposed to air at 20° C.

At 20 minutes of the fire test where fire temperature is at 780° C., at 1 m from the sample at cold side, the HCl release of the reference board and improved board are measured 10 ppm and 0 ppm respectively.

The invention claimed is:

1. A magnesium oxychloride cement (MOC) composition comprising:
   reactive MgO 7-50% by weight
   magnesium chloride 3-20% by weight,
   $H_2O$ 9-50% by weight,
   phosphoric acids or corresponding salts 0.05-5% by weight calculated as $P_2O_5$, and
   exfoliated vermiculite 1-80% by weight.

2. The MOC of claim 1 further comprising 0-20% by weight of components selected from the group consisting of additives, fillers, and stabilizers.

3. The MOC of claim 1, wherein the amount of vermiculite is from 1 to 30% by weight.

4. The MOC of claim 1, wherein the MOC further comprises at least one stabilizer to improve water resistance, selected from the group consisting of organic acids, alkyl silicates, hydrophobic silicon siloxane compounds, and mixtures thereof.

5. The MOC of claim 1, wherein the MOC is obtained by mixing
   reactive MgO 7-50% by weight,
   $MgCl_2$ 3-20% by weight,
   $H_2O$ 9-50% by weight,
   phosphoric acid or corresponding salts 0.05-5% by weight calculated as $P_2O_5$,
   exfoliated vermiculite 1-80% by weight, and
   additives or fillers 0-20% by weight.

6. The MOC of claim 1, wherein the acid or corresponding salt is selected from the group consisting of ortho-phosphoric acid, tri-sodium phosphate and its hydrates, sodium polyphosphate and its hydrates, aluminium phosphate and its hydrates, and mixtures thereof.

7. The MOC of claim 2, wherein the additive is selected from the group consisting of setting accelerators setting retarders, foaming agents, air entrainers, water repellents, super plasticizers, and mixtures thereof.

8. The MOC of claim 1, wherein the exfoliated vermiculite has a bulk density of less than 0.300 $g/cm^3$.

9. The MOC of claim 5, wherein the additives or fillers are selected from the group of $CaCO_3$, fly ash from thermal power plant, bottom ash from thermal power plant, saw dust, expanded perlite, foaming agents and/or air entrainers, cellulose fiber, chopped glass fiber, glass fiber mat, silica fume, talc, saw dust, mica and mixtures thereof.

10. The MOC of claim 9, wherein the calcite has a particle size less than 200 μm.

11. The MOC of claim 1, wherein the amount of vermiculite is from 1 to 20% by weight.

12. The MOC of claim 1, wherein the amount of vermiculite is from 5 to 20% by weight.

13. The MOC of claim 7, wherein the setting accelerator is hydrochloric acid.

14. The MOC of claim 7, wherein the setting retarder is sulphuric acid.

15. The MOC of claim 1, wherein the exfoliated vermiculite has a bulk density of between 0.050 and 0.200 $g/cm^3$.

16. The MOC of claim 1, wherein the exfoliated vermiculite has a bulk density between 0.100 and 0.150 $g/cm^3$.

17. The MOC of claim 9, wherein the calcite has a particle size from 5 to 100 μm.

18. The magnesium oxychloride cement (MOC) of claim 1 further comprising calcite ($CaCO_3$) in an amount from 0.1 to 20% by weight.

19. A product a consisting of the magnesium oxychloride cement (MOC) of claim 1 in casted or sprayed form.

20. A process of making a magnesium oxychloride cement (MOC) comprising the step of mixing reactive MgO 7-50% by weight, $MgCl_2$ 3-20% by weight, $H_2O$ 9-50% by weight, phosphoric acid or a corresponding salt 0.05-5% by weight calculated as $P_2O_5$, exfoliated vermiculite 1-80% by weight and optionally calcite 0.1 to 20% by weight.

21. The process of claim 20, further comprising the step of mixing 0-20% by weight additives or fillers.

22. A process of making a MOC matrix with reduced HCl release in case of fire comprising the step of adding a calcite ($CaCO_3$) as an additive into the MOC matrix, wherein the MOC matrix comprises reactive MgO 7-50% by weight, magnesium chloride 3-20% by weight, $H_2O$ 9-50% by weight, phosphoric acids or corresponding salts 0.05-5% by weight calculated as $P_2O_5$, and exfoliated vermiculite 1-80% by weight.

* * * * *